United States Patent [19]

Mitchell

[11] Patent Number: 5,048,382
[45] Date of Patent: Sep. 17, 1991

[54] METHOD FOR MAKING ELASTOMERIC SEALING DEVICE

[75] Inventor: Edward P. Mitchell, Bristol, Ind.

[73] Assignee: Mar Don Corporation, Park Ridge, Ill.

[21] Appl. No.: 397,578

[22] Filed: Aug. 23, 1989

[51] Int. Cl.⁵ .............................................. B23B 5/00
[52] U.S. Cl. ....................................... 82/1.11; 82/123
[58] Field of Search .................. 82/1.11, 123, 18, 173; 493/285

[56] References Cited

U.S. PATENT DOCUMENTS

| | | | |
|---|---|---|---|
| 1,582,683 | 4/1926 | Harmon | 82/1.11 |
| 2,285,583 | 6/1942 | Jennings et al. | 82/1.11 |
| 2,932,083 | 4/1960 | De Nicolo | 82/1.11 |
| 3,935,763 | 2/1976 | Glenn | 82/1.11 |
| 4,213,354 | 7/1980 | Dahinden | 82/1.11 |
| 4,640,651 | 2/1987 | Runyon | 82/1.11 |
| 4,694,118 | 9/1987 | Schmidt | 174/41 |

FOREIGN PATENT DOCUMENTS

| | | | |
|---|---|---|---|
| 192401 | 8/1986 | Japan | 82/123 |
| 197102 | 9/1986 | Japan | 82/123 |
| 1344517 | 10/1987 | U.S.S.R. | 82/123 |

*Primary Examiner*—Frederick R. Schmidt
*Assistant Examiner*—Blynn Shideler
*Attorney, Agent, or Firm*—Owen J. Murray

[57] ABSTRACT

A method of making a plurality of concentric ring cuts in a pliable device such as an elastomeric seal, by rotating the device at a speed to generate a desired centrifugal force and cutting into the rotating device with a knife while flushing the knife and elastomeric device to produce a device having one or more sets of concentric rings with each set comprised of one or more rings.

19 Claims, 3 Drawing Sheets

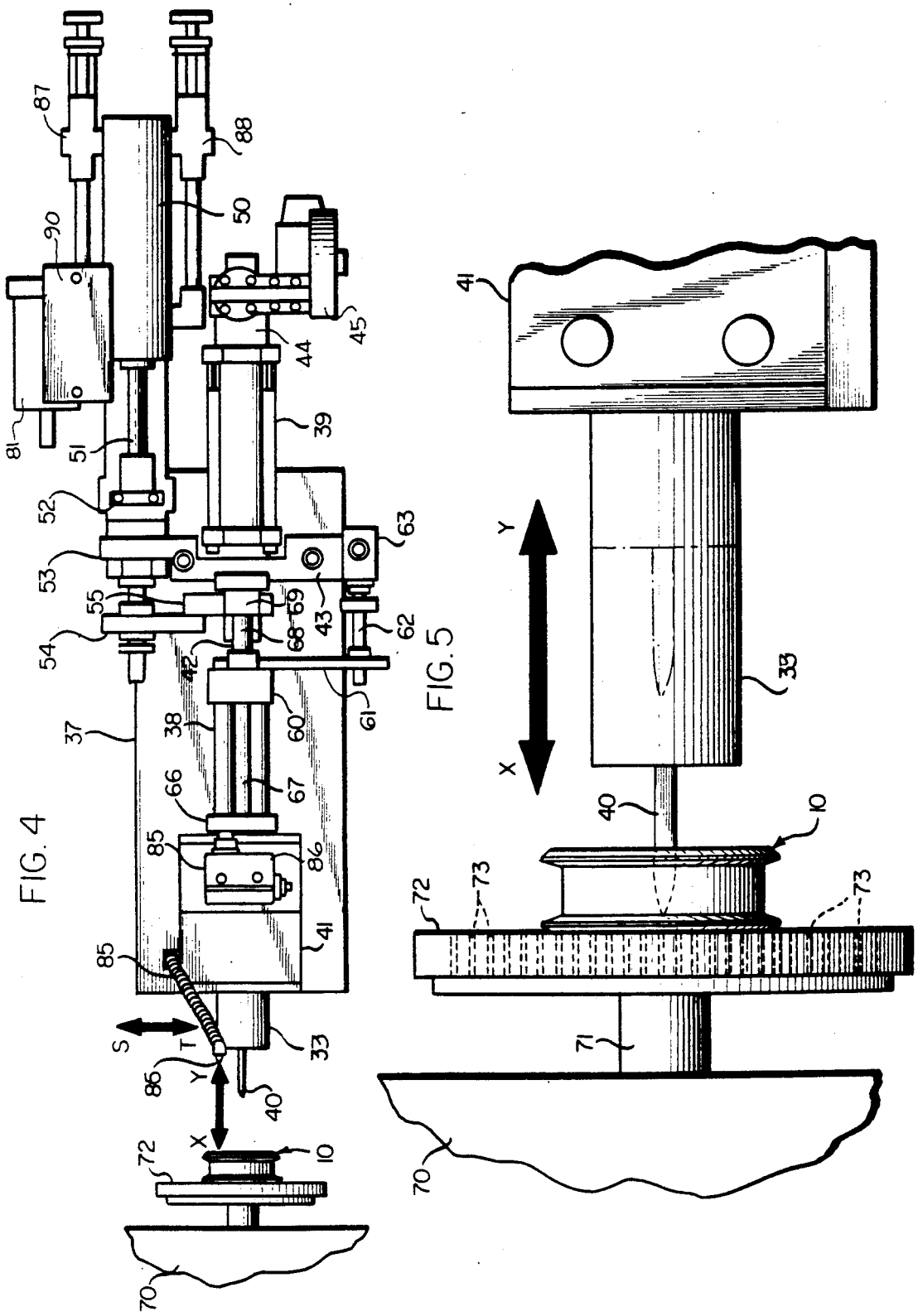

METHOD FOR MAKING ELASTOMERIC SEALING DEVICE

FIELD OF INVENTION

This invention relates to an improved sealing device for sealing electrical cables or other items; and, more particularly, to a process and product for providing an improved elastomeric sealing sleeve for use in an aerial terminal in which the sleeve has a plurality of removable concentric sizing rings.

BACKGROUND OF THE INVENTION

Aerial terminals are utilized to provide service drops for telecommunication cables. Telecommunication cables are fed to the inlet side of a terminal which comprises a one-piece housing assembly. Appropriate splicing is provided within the housing whereby a plurality of cables exit the exit side of the housing to provide desired service drops to a plant, subscriber or other suitable facility.

One aerial terminal which has been utilized is sold by G-A-T-M Corp. of Brooksville, Fla. and is exemplified in a catalog number 5000 Series Aerial Terminal. The terminal also is disclosed in U.S. Pat. No. 4,694,118 entitled "Aerial Terminal for Telecommunication Cables." The aerial terminal comprises a unitary plastic housing at each end of which is located an elastomeric sleeve. One sleeve is inserted about one or more entrance cables which feed into the terminal whereas the remaining sleeve is disposed about the cables exiting the terminal.

The sealing sleeve comprises an elastomeric part having a plurality of circular concentric rings, each of which extends through substantially the depth of the sleeve. For example, in one application, the sealing sleeve is approximately 3.50 inches in diameter and has a sleeve thickness of 1.00 inch. Approximately 22 concentric sizing rings are disposed in the sleeve, each ring extending from one side of the sleeve to approximately 0.040 inch of the opposite side. The sleeve also is slit radially cutting across each concentric ring, the slit extending throughout the depth of the sleeve.

In application, the electrical cable(s) to be inserted into the sleeve is measured to ascertain the overall cable diameter. The installer then removes an appropriate number of concentric rings from the sleeve so that the cable or cables fit comfortably in the sleeve. Subsequently, a hose clamp is placed about the circumference of the sleeve and pulled tight thereby compressing the sleeve about the cable(s) to provide a weathertight seal between the sleeve and cable(s).

Unfortunately, it has been found that sealing sleeves presently available are not entirely satisfactory. In some instances, the concentric rings are not properly cut, the result of which is that an installer at a job site experiences difficulty pulling the concentric rings from the sleeve when fitting the sleeve for a particular cable or cables. The installer either tears off an excess portion of the sleeve or leaves a portion of a concentric ring section in the sleeve.

Additionally, it has been found that on some occasions, the concentric rings are cut such that they extend throughout the thickness of the sleeve as opposed to each concentric ring extending substantially, but not entirely through, the sleeve thickness. It is preferred that one side or face of the sleeve not be cut when the concentric rings are placed in the sleeve.

Finally, it has been found that various sleeves presently available have a considerable amount of a talc material covering the sleeve. Unfortunately, the talc, which is employed in the rubber industry to preclude rubber parts from joining or otherwise sticking together, is rather unsightly and undesirable.

What is desired is to have an elastomeric sealing sleeve for use in an aerial terminal in which the sleeve has a plurality of cleanly cut concentric fitting rings. It is further desired to have a sealing sleeve in which the concentric ring cuts do not extend entirely throughout the sleeve thickness. Finally, it is desired to fabricate a sealing sleeve in an efficient manner in which the need for a talc-like material is obviated.

SUMMARY OF THE INVENTION

The invention disclosed and claimed herein serves to achieve the above-identified desires and to minimize the problems associated with prior art sealing sleeves. An improved elastomeric sealing sleeve is provided in which the concentric rings are cut cleanly into the sleeve for substantially the entire thickness of the sleeve. Each ring is cut entirely about its circumference without unwanted serrations occurring in the sleeve. Additionally, the sleeve is fabricated without the need for a talc material.

Briefly, in the process of the present invention, a molded, extruded or die-cut elastomeric sleeve having an appropriate size and shape is positioned on a chuck means whereby one side or face of the sleeve is maintained by a vacuum means against the outer face of the chuck.

A cutting machine, which holds a cutting knife, is indexed to align the knife relative to a selected position on the remaining side of the sleeve. The chuck and sleeve then are rotated at a desired speed whereby the sleeve is spun about its longitudinal axis. The cutting machine is actuated whereby the knife enters one side of the rotating sleeve and commences to cut a concentric ring into the sleeve.

As the knife progressively cuts into the sleeve, elastomeric sleeve material located contiguous to the outboard side of the knife separates slightly from the sleeve material located adjacent the inboard side of the cutting knife. Without being bound by a particular theory, it is believed that the separation of sleeve material in the vicinity of the knife blade is caused by the centrifugal force acting on the rotating sleeve. In other words, a small pocket is formed in the sleeve at least at the location of the cutting knife, the effect of which is to allow the knife blade to penetrate relatively cleanly and easily into the elastomeric sleeve such that a concentric ring is cut cleanly into the sleeve.

The cutting machine then is actuated whereby the cutting knife is retracted from the sleeve and indexed radially outward to a second location where a second concentric ring is cut into the face of the rotating sleeve. The process is repeated until the desired number of concentric rings are cut into the sleeve.

While cutting operations are performed on the sleeve, the sleeve and cutting tool are flushed extensively with a cooling lubricant to preclude excessive heat build up occurring in the sleeve and knife, the attendant disadvantage being that heat generated in the cutting operation tends to reseal adjacent sections of the sleeve which have been cut.

It is believed that the rotating sleeve generates a centrifugal force which serves to separate adjacent portions of the sleeve at least in the area where the knife is cutting the elastomeric sleeve. This material separation allows the knife blade to make a clean ring cut into the elastomeric material thereby obviating the serrated ring problem which presently exists.

No talc-like material is required such that, upon completion of a cutting operation, an improved elastomeric sealing sleeve is provided having the desired number of concentric rings disposed therein. Moreover, one side or face of the sleeve is free of any cuts or nicks.

Other objects and advantages of the invention will become apparent upon reading the following description of the drawings and the detailed description of the invention.

DESCRIPTION OF THE DRAWINGS

FIG. 4 shows a partial, plan view of the machine of FIG. 3;

FIG. 5 shows a fragmentary, plan view of a knife cutting a concentric ring into an elastomeric sleeve of the present invention;

DETAILED DESCRIPTION

Figure 1:
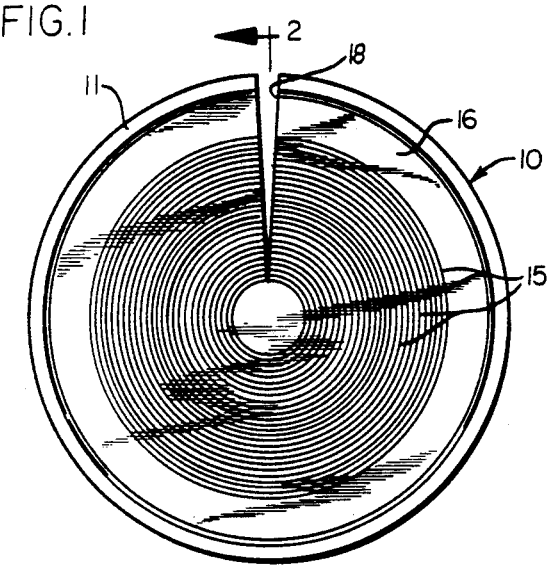
FIG. 1 shows an elastomeric sleeve made according to the process of the present invention.
Figure 2:
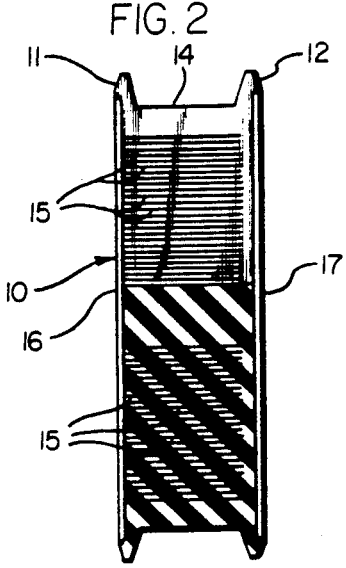
FIG. 2 shows a cross-section view taken along lines 2—2 in FIG. 1.
Figure 3:
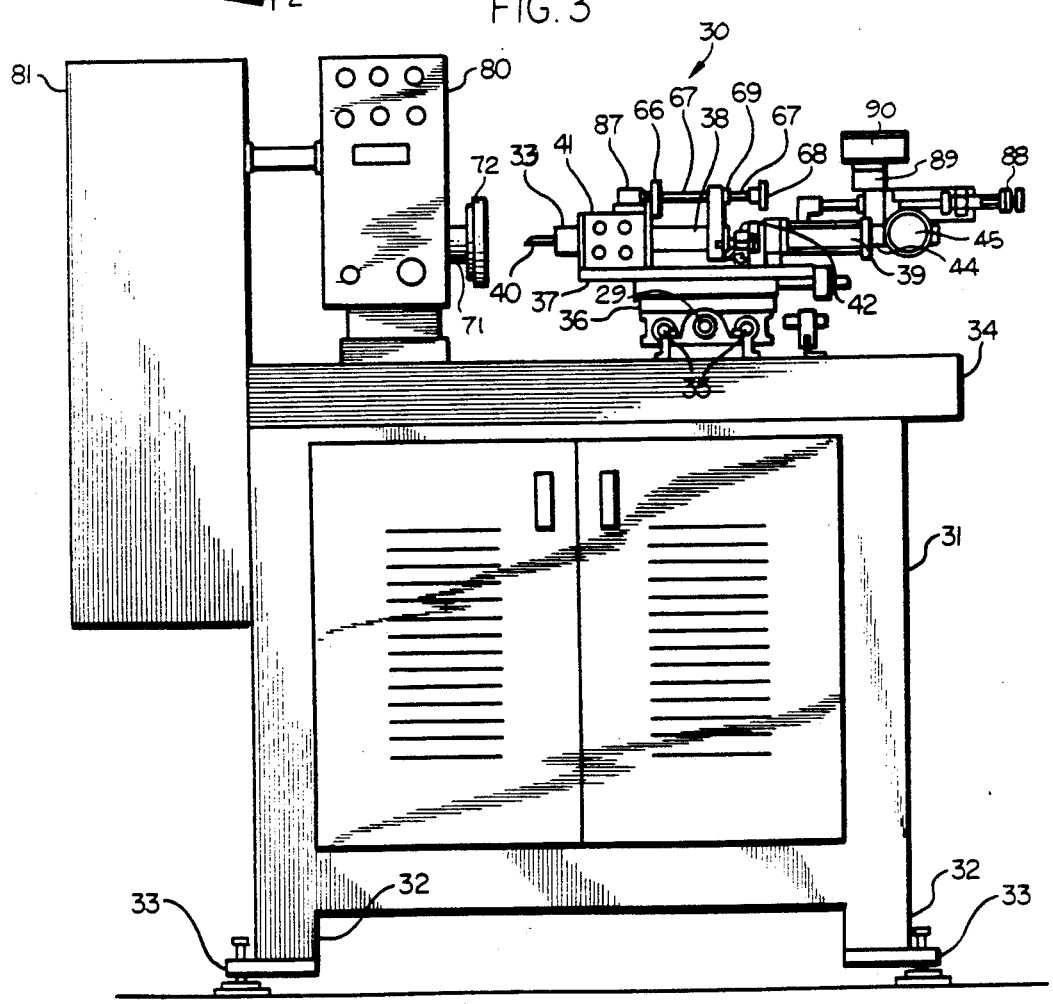
FIG. 3 shows a front view of an indexable cutting machine for carrying out the process of the present invention.

Referring to the drawings, there is shown in FIG. 1 a sealing sleeve 10 formed of a pliant material. Sleeve 10 has a circular shape having flanges 11, 12 extending outwardly from each side of the sleeve to form a recess 14 about the circumference of the circular sleeve. The sleeve further includes a plurality of concentric, radially spaced ring sections 15 each of which is cut into the sleeve 10 for substantially the entire sleeve thickness and specifically from side 16 contiguous to side 17 as seen in FIG. 2. By removing one or more ring sections, a desired size of aperture may be achieved in the sleeve such that a single sealing sleeve 10 is capable of enclosing telecommunication cables having different diameters. A radial slit 18 extends from the center of sleeve 10 to the perimeter of the sleeve.

In use, an installer first sizes the cable upon which sleeve 10 is to be sealed. Then, the requisite number of ring sections 15 are removed from the sleeve to form the desired aperture. Spreading the sleeve along slit 18, the sleeve is slipped onto the cable. A flexible metal hose connector, not shown, is placed in sleeve recess 14 and a threaded fastener is tightened compressing the hose connector and sleeve until sleeve 10 is compressed into an intimate, weathertight contact with the exterior surfaces of the telecommunication cable.

Sleeve 10 generally is molded from a material that is sufficiently pliant such that sleeve 10 can be compressed as required and can be forced open easily at slit 18. One material that has been utilized is an elastomeric material made from chloroprene having a durometer, when molded, of about 60 (A scale). The sleeve is molded to have a shape that will fit into the seal retaining area. It has been found that a suitable gate location for the mold is any point on the perimeter of the sleeve in recess 14 formed by flanges 11, 12.

Following a conventional sleeve molding operation, concentric rings are cut into the sleeve by cutting machine 30 or other suitable apparatus.

Cutting machine 30 includes frame 31 having legs 32 connected to the floor by adjustable fastening means 33.

Base 34 is disposed on top of frame 31, the base, in turn, being disposed in a trough, not shown, which receives lubricating fluid following lubrication of a sleeve during a cutting operation. The lubricating fluid falls onto the base where it spills over into a collecting trough where it is collected and recirculated.

Disposed on base 34 is a pair of parallel rails 35. Carriage 36 moves on rails 35, the carriage being adapted to move in an S-T direction as indicated by the arrow in FIG. 4 by means of a ball screw and ball nut illustrated at 29.

Plate 37 is mounted on carriage 36. A reciprocating bar 38 is disposed on plate 37 for axial movement in the X-Y direction. At one end of bar 38 is a cutting knife chuck 33 which holds a cutting knife 40. Bar 38 is mounted for movement within a bar support member 41 which, in turn, is fastened to plate 37. Support member 41 surrounds bar 38 on all sides and permits the bar to slidably move within the support. An air or other fluid cylinder 39 having a movable piston 42, which is connected to the remaining end of bar 38, is seated in a first cylinder frame 43 mounted on plate 37. An air valve assembly 44 and an electrical junction box 45, which contains the electrical controls for actuating air valve assembly 44, serve to admit air into air cylinder 39. Upon actuation of cylinder 39 by valve assembly means 44, piston 42 is actuated to move block 38, chuck 33 and knife 40 in the X or Y direction shown in FIG. 4.

A second hydraulic cylinder assembly 50 having a piston 51 is disposed on plate 37. Piston 51 passes through a suiting bearing assembly 52 which is attached to a bearing frame 53. Frame 53 is mounted on plate 37. Needle valves 87, 88, each of which permits oil to flow into the cylinder at a predetermined rate, are connected to cylinder assembly 50 to allow oil to flow into cylinder 50. Reservoir 89 contains a balance cylinder which, upon movement of the cylinder within the reservoir, directs oil to one of the needle valves 87, 88. An electrical junction box 90 includes the electrical connections for controlling the flow of oil from reservoir 89 to needle valves 87, 88 and cylinder assembly 50.

The outboard end of piston 51 is connected to a stop arm 54. Movement of piston 51 permits movement of stop arm 54. Stop arm 54 extends radially outward from piston 51 toward piston arm 42. A second stop arm 55 is connected to piston 42 and is adapted to contact arm 54 when machine 30 is in operation. Hydraulic cylinder 50 is actuated in tandem with air cylinder 39 such that piston 51 will restrict the speed of travel of piston 42 with the result being that, upon actuation, stop arm 54 contacts stop arm 55. Thus, hydraulic cylinder assembly 50 regulates the speed of movement of piston 42 and bar 38 whereby the speed with which knife 40 enters elastomeric sleeve 10 is controlled. A hydraulic system comprising cylinder assembly 50, piston 51 and needle valves 87, 88, reservoir assembly 89 and box 90, which is satisfactory for this application, is sold under the trade name of Hydrocheck by Schroeder Bellows Company, Akron, Ohio, catalog number Baker 171-21012.

Bracket 60 is fixedly mounted on movable bar 38 and arm 61 extends outward from the bracket. Finger 62, which is parallel to the longitudinal axis of bar 38, is fixed by any suitable means to the outboard end of arm 61. Finger 62 serves to contact a switch member 63 and stops the bar 38 and piston 42 as the bar moves in the "Y" direction shown in FIG. 4. Actuation of the switch member also provides information to a programmable controller or other suitable means to index carriage 36 to a new position on rails 35.

Piston stop 66 is mounted onto the side of fixed bar support member 41. A stop screw 67 having an adjusting head 68 is threaded into bracket 60. Nut 69 serves to lock screw 67 into position relative to bracket 60. A micro switch device 86 contacts stop 66 such that when stop screw contacts stop 66, micro switch 86 directs a programmer controller, not shown, to actuate cylinder 39 whereby knife 40 is withdrawn from sleeve 10 following completion of a ring cutting operation.

A vacuum pump assembly 70, which includes a detachable chuck means 71, is mounted on base 34. Chuck means 71 includes a flat face plate 72 having a plurality of perforations 73. Upon actuation of the vacuum pump, a vacuum is pulled on plate 72 at the location of perforations 73 sufficient to hold sleeve 10 onto the chuck 71 as shown, for example, in FIGS. 5 and 7.

An electrical control panel 80 is disposed adjacent the vacuum pump assembly and a switchboard assembly panel 81 for housing suitable and conventional electrical controls for actuating conventional drive motors and the like is positioned at one end of base 34. Drive means include motors or other suitable means for rotating chuck means 72 and transporting carriage 46 on rails 45.

A hose 85 having a nozzle 86 is shown in FIG. 4. Hose 85 leads to a lubricating pump assembly 87.

OPERATION

Figure 7:
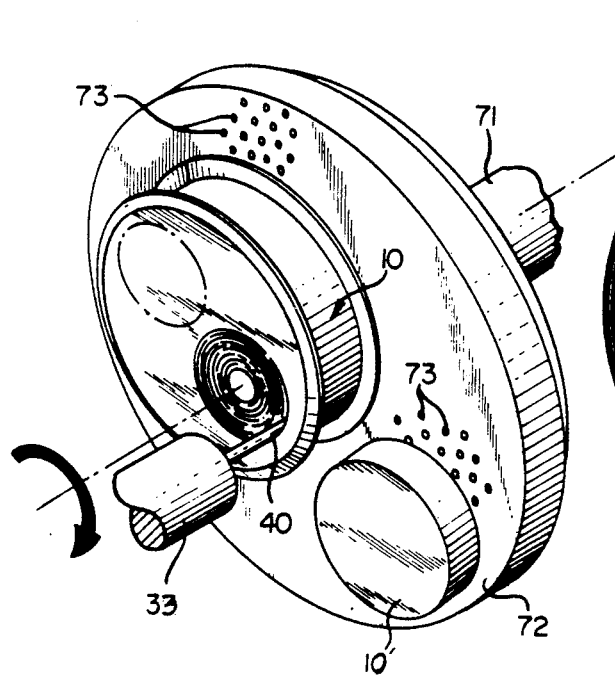
FIG. 7 shows a fragmentary, perspective view of a knife cutting two sets of concentric rings into an elastomeric ring disposed on a vacuum chuck means; and, FIG. 8 shows an elastomeric sleeve of the present invention having three sets of concentric rings disposed therein.

In operation, a vacuum is pulled on sleeve chuck 71, whereby face 17 of sleeve 10 is positioned and maintained on chuck 71. Preferably, a vacuum of about 20 inches Hg is required to hold an elastomeric sleeve 3.50 inches in overall diameter and 1.00 inch thick onto chuck face 72. Once sleeve 10 is installed, chuck 71 is rotated in a clock-wise direction as illustrated in FIG. 7. The speed of rotation for an elastomeric sleeve having a durometer of 60 (A scale), 3.50 inches in diameter and 1.00 inch thick is 2200 RPM. It is appreciated that different speeds of rotation will be required for different size and shape sleeves; however, the appropriate speed can be ascertained relatively easily by experimentation.

Machine 30 is actuated whereby cylinder assemblies 39 and 50 are activated. Bar 38 and knife 40 move in a direction perpendicular to sleeve face 16, whereby knife 40 cuts into rotating sleeve 10 as illustrated in FIGS. 5–7.

The knife blade has a slightly arcuate or convex surface 40' and slightly concave surface 40". One knife blade satisfactory for this application is made from a C-2 carbide material designated as Stellite. Knife blades 40 can be replaced as the blade edges become dull over a period of time. It is important that the knife have relatively sharp cutting edges during the course of a sleeve cutting operation. As the knife cuts into the sleeve, to form a slit as shown, for example, in FIGS. 2 and 6 the elastomeric sleeve material located contiguous to the outboard side 40' of knife 40 pulls outwardly away from the knife blade due to the centrifugal force generated by the rotating sleeve. The knife continues to penetrate into the sleeve until piston stop 66 is contacted by adjustable screw 67. Typically, the cut commences at one face 16 and continues through the sleeve to about 0.040 inches from the opposite face 17. Knife 40 then is withdrawn, the knife moving in the Y direction until finger 62 contacts switch member 63 at which point knife 40 is completely withdrawn from sleeve 10. Carriage 36 is indexed along rails 35 to the location of another ring. The cutting process is repeated until the desired number of slit rings are cut into the sleeve thereby forming a plurality of ring sections 15 as seen, for example, in FIGS. 2 and 6.

The knife speed for a 3.50 inch diameter sleeve defined above is 1.00 inches/second for ring cuts made into the sleeve up to cuts of about two (2) inches diameter. For large concentric rings, the knife speed is reduced to 0.50 inches/second, inasmuch as the sleeve material tends to fly away from the knife area at the higher speeds. Reducing the penetration speed of the knife for the larger diameter ring cuts provides a relatively clean cut.

Figure 6:
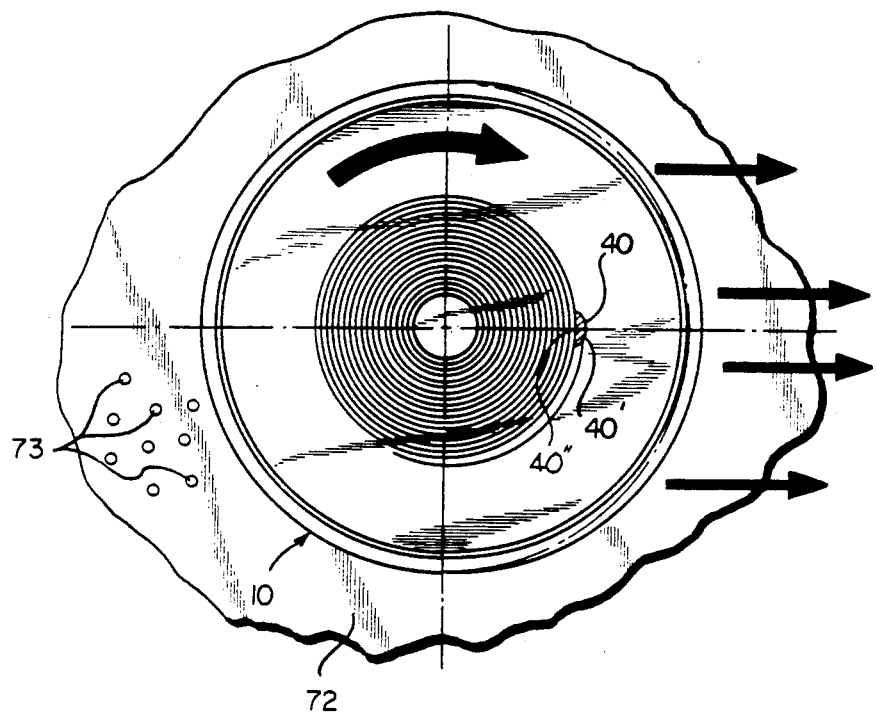
FIG. 6 shows a fragmentary, elevation view of a knife disposed in a concentric ring being cut into an elastomeric sleeve.

FIG. 6 illustrates a sleeve having a set of concentric rings which form ring sections 15 extending radially outward from the center of the sleeve. FIG. 7 shows a sleeve positioned on face 72 of vacuum chuck 71 whereby two sets of concentric rings 15 are cut into sleeve 10. When cutting two or more sets of rings, sleeve 10 is offset from the center of vacuum chuck 71. Accordingly, a counterweight 10' is required. The counterweight is maintained on face 72 of chuck 71 by means of a conventional fastener assembly, not shown, whereby the weight is bolted onto the chuck means in a desired position.

Figure 8:
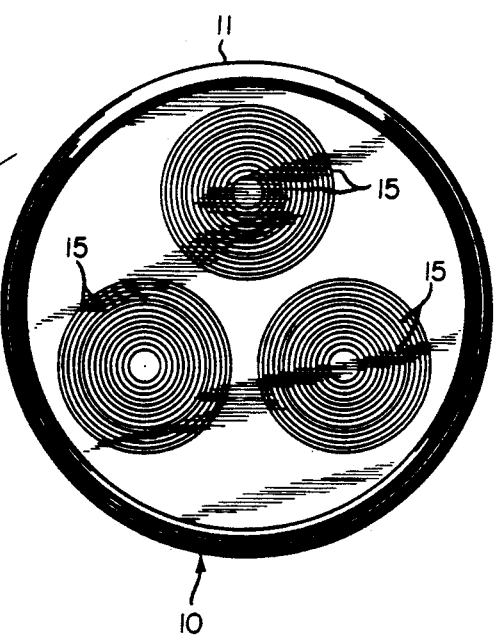

FIG. 8 shows a further illustration of a sleeve 10 having three sets of concentric rings.

In the course of a cutting operation, a liquid lubricant such as a silicone emulsion sold by Dow Corning Corporation, Midland, Mich., catalog number DC-347, is flushed freely onto knife 40 and sleeve 10 cooling them and precluding the sleeve material from resealing after a cutting operation.

It is theorized that by generating a suitable centrifugal force during a cutting operation, the elastomeric material on the outboard side 41' of knife 40 is pulled away or directed outwardly sufficiently such that the knife can enter a sleeve and travel in the X direction where it makes a relatively clean cut.

It has been found that as the concentric cuts progress outwardly toward the periphery of the sleeve, the sleeve material tends to separate too quickly during a cutting operation. As a result, the sleeve material tends to tear too much material such that a proper cut is not made. As discussed above, it has been found that by reducing the speed of penetration of knife 40 into sleeve 10 during the course of cutting the larger diameter rings, the desired cut can be made. The proper speed for a particular cut can be determined by experimentation.

Rotating the vacuum held elastomeric sleeve material while the sleeve is cut and flushed, permits a sealing sleeve to be made which provides desired sets of concentric rings in which each ring is relatively cleanly cut. The depth of cut also can be controlled so that the cuts do not extend throughout the entire sleeve. Moreover, a talc material presently utilized to fabricate sealing sleeves is unnecessary.

It is important that a pliable material be used for the sleeve device. A molded, extruded or die-cut elastomeric sleeve or device having a durometer in the range of about 35-75 (A scale) could be used, however, a durometer of about 55-65, and specifically 60 (A scale), is preferred.

The invention has been illustrated with the cutting of rings into an elastomeric sleeve used for installation in an aerial terminal. It is appreciated a device could be made in accordance with the process of the present invention and used in other applications such as for grommets, plugs, seals or washers in the aircraft and aerospace industry. Similarly, electrical and water transmission seals, plugs or grommets could be made in accordance with the present invention. Plugs, seals or grommets could also be used in the oil and gas fields or shipbuilding plugs, grommets or washers could be made. It is also envisioned that devices such as seals, plugs, washers or grommets would be made for use in the bio-medical industry where parts, often fabricated from a silicone material, are placed in the body.

Further, while the sleeve device illustrated in the drawings has been round, it is appreciated that it would be expedient to a person of ordinary skill in the art to use the process disclosed and claimed herein with devices having different desired sizes and shapes such as square, triangular or rectangular, as well as round.

While one or more embodiments of the invention have been herein illustrated and described in detail, it will be understood that modifications and variations thereof may be effected without departing from the spirit of the invention and the scope of the appended claims.

What is claimed is:

1. A process of producing a plurality of knife cut concentric ring sections into a device having first and second faces and formed of a non metallic pliant material, said ring sections being concentric with an axis of said device and extending parallel with said axis, said process comprising the steps of:
   a. mounting said first face of said device in a rotatable chuck means having a rotatable axis;
   b. rotating said device about said axis on said chuck means;
   c. positioning a knife means substantially perpendicular to the second face of said device at a first radial distance from said axis;
   d. moving said knife means parallel with said axis relative to said device whereby said knife means cuts a slit ring into said device while said device is rotated, said knife means moving to a position more closely adjacent said first face;
   e. continually rotating said device while said knife means continues to cut into said device;
   f. positioning said knife at another radial distance from said axis, and repeating steps d. and e. thereby forming a ring section;
   g. positioning said knife at another radial distance from said axis and repeating steps d. and e. to form a second ring section; and,
   h. dismounting said device from said chuck without removing said ring sections from said device.

2. A process in accordance with claim 1 wherein said device is an elastomeric material.

3. A process in accordance with claim 2 wherein said device has a durometer in the range of 35-75 (A scale).

4. A process in accordance with claim 1 wherein said device has a durometer of about 60 (A scale).

5. The process of claim 1 wherein said device is maintained against said rotating chuck by means of a vacuum seal between said first device face and said chuck.

6. The process of claim 1 wherein the speed at which said knife moves parallel with said axis and enters said device varies as said knife is spaced further from said first knife position.

7. The process of claim 6 wherein said knife speed entering said device is reduced as larger concentric rings are cut into said device.

8. The process of claim 1 and further including the step of slitting the device radially following the cutting of one or more rings into said device.

9. A process in accordance with claim 1 in which a plurality of concentric ring sets, each set having at least one ring, are cut into the device.

10. A process in accordance with claim 1 in which a plurality of sets of concentric ring sections are formed and the axis of at least one set is offset from said axis of said device.

11. A process in accordance with claim 10 wherein said axis of each set is offset from the axis of said device.

12. A process of producing at least one knife cut concentric ring section in an elastomeric sleeve formed of a pliant non metallic material and which sleeve has a first face and a second face, said process comprising the steps of:
   a. mounting said first face of said sleeve on a rotatable chuck means;
   b. rotating said sleeve on said chuck means;
   c. positioning a knife means substantially perpendicular to the second face of said sleeve;
   d. moving said knife means in a direction substantially perpendicular to said second sleeve face whereby said knife means cuts a slit ring into said sleeve while said sleeve is rotated to form a concentric knife cut ring into said sleeve material;
   e. rotating said sleeve while said knife means continues to cut a slit ring into said sleeve, said cut extending from said second face contiguous to said first face mounted on said chuck means;
   f. withdrawing said knife means from said sleeve in a direction substantially perpendicular to said second face;
   g. positioning said knife at another radial distance from said axis, and repeating steps d., e. and f. to form a ring section; and,
   h. removing said sleeve from said chuck means without removing the cut ring section from said sleeve.

13. The process of claim 12 and further including the steps of indexing said knife means to additional locations on said sleeve and repeating steps (d)–(h) at each location.

14. A process in accordance with claim 12 in which a plurality of sets of concentric ring sections are formed in said sleeve and the axis of at least one set is offset from the center of said sleeve.

15. A process in accordance with claim 14 wherein said axis of each set is offset from the center of each sleeve.

16. A process in accordance with claim 12 wherein the speed at which said knife moves parallel with said axis and enters said sleeve varies as said knife is spaced further from said first knife position.

17. A process in accordance with claim 16 wherein said knife speed entering said sleeve is reduced as larger concentric rings are cut into said sleeve.

18. A process in accordance with claim 1 or 12 in which said slit rings are formed in the absence of a talc material.

19. The process of claim 1 or 13 and further including the step of lubricating said knife means and sleeve while cutting said sleeve.

* * * * *